United States Patent [19]
Wolff

[11] 3,797,810
[45] Mar. 19, 1974

[54] GAS AND LIQUID CONTACT APPARATUS
[75] Inventor: Heinz Wolff, Bochum, Germany
[73] Assignee: Dr. C. Otto & Comp. G.m.b.H, Bochum, Germany
[22] Filed: Dec. 3, 1970
[21] Appl. No.: 94,641

[30] Foreign Application Priority Data
Dec. 8, 1969  Germany............................ 1961426

[52] U.S. Cl. .............................. 261/111, 261/112
[51] Int. Cl. ................................................ B01f 3/04
[58] Field of Search ............................ 261/108–112

[56] References Cited
UNITED STATES PATENTS
| | | | |
|---|---|---|---|
| 1,480,888 | 1/1924 | Marshall | 261/114 A |
| 2,978,998 | 4/1961 | Frankland | 261/110 |
| 3,658,484 | 4/1972 | Bright | 261/114 R |
| 1,292,125 | 1/1919 | Stevens | 261/112 |
| 999,213 | 8/1911 | Durant | 261/114 R |

Primary Examiner—Tim R. Miles
Assistant Examiner—Steven H. Markowitz
Attorney, Agent, or Firm—Brown, Murray, Flick & Peckham

[57] ABSTRACT

A horizontal outer ring is sealed to the inner surface of the side wall of a vertical shell. Above this ring is an upper series of vertically spaced horizontal rings decreasing in size upwardly. Above the top ring there is a horizontal top plate that is smaller than the top ring. Below the outer ring there is a lower series of vertically spaced horizontal rings decreasing in size downwardly. Provision is made for continuously delivering liquid to the top plate in the shell, and the rings are dimensioned to cause the liquid leaving the edge of the top plate to cascade down the upper series of rings over their outer edges and then down the lower series of rings over their inner edges while a gas is flowing upwardly through the shell and back and forth through the cascading liquid.

7 Claims, 3 Drawing Figures

PATENTED MAR 19 1974 3,797,810
SHEET 1 OF 2
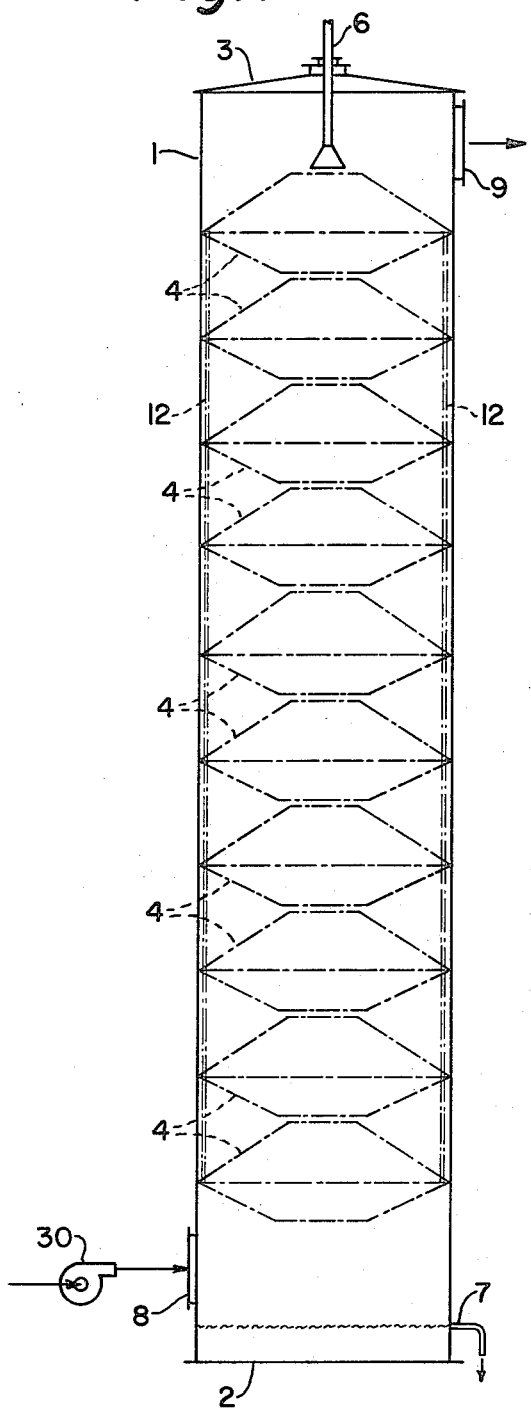
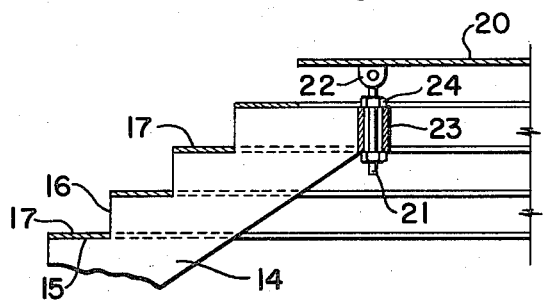
INVENTOR
HEINZ WOLFF
BY Brown, Murray,
Flick & Peckham
ATTORNEYS

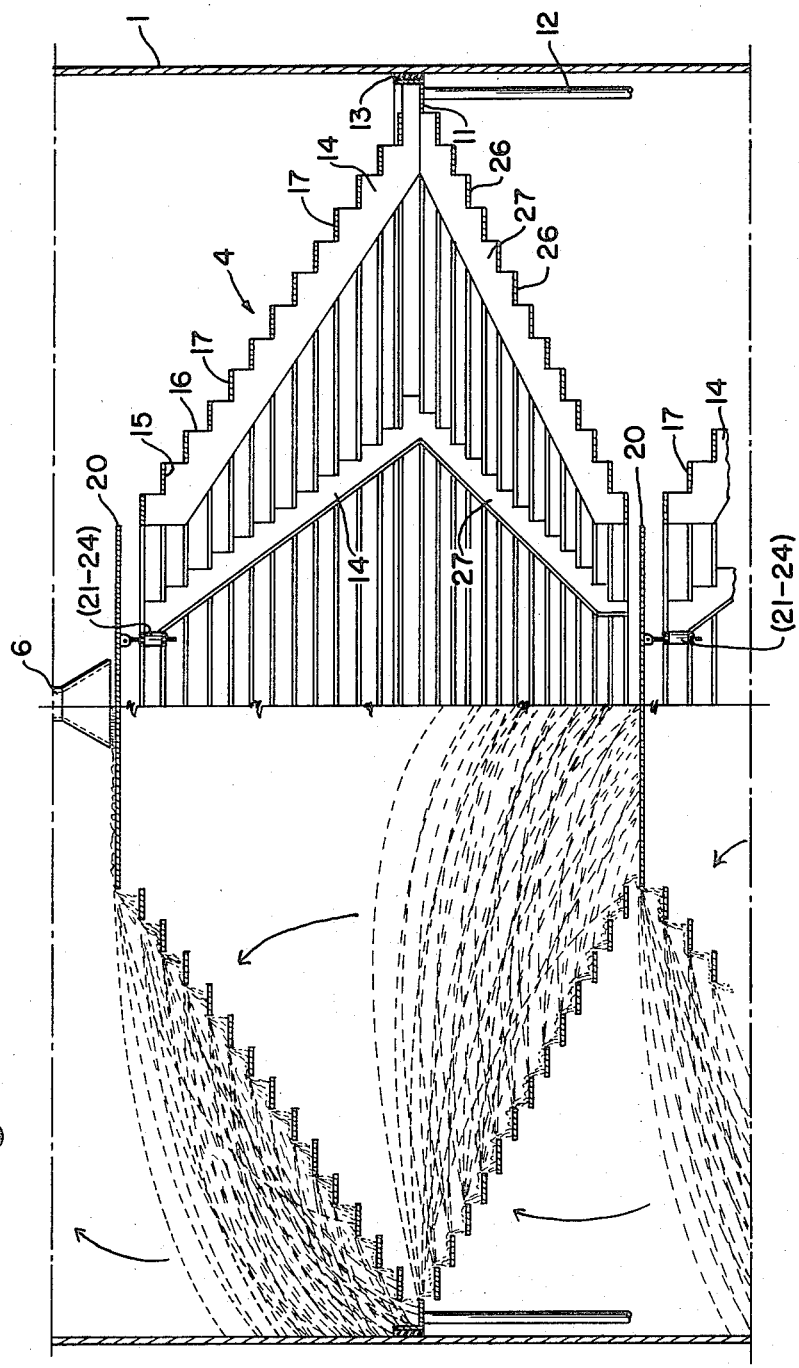

GAS AND LIQUID CONTACT APPARATUS

This invention relates to gas and liquid contact apparatus, in which an ascending gas current passes back and forth through a descending liquid, such as in scrubbers, fractionating columns and heat exchangers.

For the separation of different components from gases by means of liquids, scrubbers of various forms are used for the purpose of producing the best possible interaction of the gases and liquids. There are plate scrubbers in many forms, packed columns in which the packing is of different types, and scrubbers in which a large surface of washing liquid is achieved by spraying it in very fine droplets. Very often a very slight pressure loss in the scrubber is required for the process. This is usually the case if very large volumes of gas are scrubbed at atmospheric pressure, such as, for example, in the removal of benzene or ammonia from coke oven gases.

If a slight pressure loss is required in the case of large volumes of gas, rather large diameter apparatus are produced at the permissible gas velocity. This has an extremely unfavorable influence on the admission of the liquid ($m^3$ liquid/$m^2$ scrubber cross section). There also is danger of incomplete wetting of the packing. As a rule, an attempt is made to solve the problem by dividing the scrubber into different stages and by circulating the washing liquid within these stages, but this measure involves very high consumption of electric power.

The spraying of very small quantities of liquid also involves difficulties. Thus, spray towers are also operated as stage scrubbers in the previously described case in order to have sufficient liquid available for the large cross section of the scrubber. The consumption of electric power is also high here.

It is among the objects of this invention to provide gas and liquid contact apparatus in which there are interior elements that will produce sufficient scrubbing action, in which there are low power requirements for pumping the scrubbing liquid, in which there is a moderate pressure drop in the gas, and in which scrubbing action can take place at a gas velocity that produces a division of the washing liquid into very fine droplets.

The preferred embodiment of the invention is illustrated in the accompanying drawings, in which FIG. 1 is a side view of my apparatus;

FIG. 2 is an enlarged fragmentary central vertical section of the apparatus, with half of the view indicating gas being scrubbed by a liquid; and FIG. 3 is an enlarged detail of FIG. 2.

Referring to FIG. 1 of the drawings, a tall column is formed from a vertical shell 1 that may be polygonal in horizontal section, but preferably is circular. The lower end of the shell is closed by a bottom wall 2 and the upper end is closed by a top wall or cover 3. Inside the shell there is a number of vertically spaced units 4 of gas and liquid contact elements. A pipe 6 extends down through the cover of the shell for delivering a scrubbing or washing liquid to the uppermost unit. Near the bottom of the shell there is an outlet 7 for the liquid that accumulates there. Beneath the lowest unit 4 in the column the side wall of the shell is provided with an inlet 8 for a gas to be scrubbed. An outlet 9 for the gas is formed near the top of the shell above the uppermost unit.

The gas and liquids contact units can best be described by referring to FIG. 2, which shows a complete unit and the upper part of the one below it. Each unit includes a horizontal outer ring 11 that rests on supports 12 that are adjustable in height to position the ring as nearly horizontal as possible. Secured to the ring is a sealing member 13 that extends around the inside of the shell in engagement with its inner surface so that there can be no leakage of gas up between the ring and the shell. Attached to the outer ring at circumferentially spaced points and supported thereby are the lower ends of several support strips 14 that are inclined inwardly and upwardly toward the vertical axis of the shell. The upper edges of these strips are provided with uniformly spaced steps 15 separated by vertical risers 16. Mounted on the steps are rings 17, all of different diameters. The rings in this upper series decrease in diameter from the outer ring 11 upwardly to the tops of the support strips, like a flight of circular stairs.

Spaced above the top ring is a horizontal plate 20 that, as shown best in FIG. 3, is supported from at least three of the support strips by bolts 21 pivoted at their upper ends to brackets 22 secured to the bottom of the plate. The bolts extend down through sleeves 23 attached to the upper ends of the support strips and are vertically adjustable in the sleeves by means of nuts 24 carried by the bolts. By running the nuts up or down the bolts, the top plate can be adjusted into perfectly horizontal position.

Although the top plate and the rings can be polygonal if the shell is polygonal in cross section, it is generally simpler to make the shell cylindrical and the rings and plate circular. Normally, they will be concentric with the shell. The outer diameter of the top plate is substantially the same as the inner diameter of the top ring, and the outer diameter of each ring is approximately the same as the inner diameter of the ring directly below it. Thus, the top plate and all of the rings mentioned so far could be cut, without any waste, from a single solid plate or disk having a diameter equal to the outer diameter of the outer ring. Rings that overlap one another slightly could be used, but they would be more expensive to produce.

Below the outer ring 11 there is another series of vertically spaced rings 26, but the diameters of these rings decrease downwardly in the series. They are secured to the steps of inverted downwardly and inwardly inclined support strips 27 similar to those that support the rings in the upper series. The upper ends of these support strips are secured to strips 14 and the outer ring 11, from which they are suspended. The inside diameter of the bottom ring is substantially the same as the diameter of the top plate 20. Each ring in the lower series preferably is the same size as the ring directly above it in the upper series.

Each unit 4 in the column is constructed in the same way as the one just described. The top plate 20 of each group is spaced a short distance below the bottom ring of the unit above it.

Washing liquid is delivered by pipe 6 to the center of the top plate of the uppermost unit 4 and flows outwardly and down over the edge of that plate. As it does so it falls on the top ring 17 and flows out and over its outer edge and cascades from ring to ring in the upper series until it reaches the outer ring 11. The liquid then flows inwardly and down over the inner edge of the outer ring and onto the upper ring of the lower series, from the inner edge of which it cascades on down over the inner edges of the rings 26 below in this lower series. As the liquid leaves the inner edge of the bottom ring it falls onto the top plate of the next unit and the flow just described then is repeated at this unit and at each succeeding lower unit until the liquid falls into the bottom of the tank. It will be seen that the flow down through the shell is in a zig-zag path.

While the liquid is cascading down over the rings in the manner just explained, gas that enters the lower end of the shell through its inlet 8 flows up around the bottom half of the lowest unit 4 and then inwardly between the rings in the lower series of that unit and then upwardly inside of it and outwardly between the rings in its upper series. The same pattern of gas flow is followed for each succeeding unit until the gas finally leaves the uppermost unit and exits from the shell through outlet 9. The direction of the gas flow tends to blow the liquid inwardly in the lower half of each unit and outwardly in the upper half, so there is no tendency for the liquid to run off the outer edges of the rings in the lower series or off the inner edges of the rings in the upper series.

As the gas flows through the liquid curtains falling from the edges of the rings, it breaks up the liquid more or less into drops, depending upon the velocity of the gas and the thickness of the liquid curtains. The gas may be delivered to inlet 8 by a pump 30. If the velocity of the gas entering the shell is great enough, the liquid will be separated into very fine droplets and carried a considerable distance as shown in the left-hand half of FIG. 2. The distance between the rings is important for the method of operation of each unit. This distance and the gas velocity determine the type of division of the falling liquid and the effectiveness of exchange between the gas and washing liquid. The kinetic energy of the gas promotes the thorough mixing of gas and washing liquid.

The finest drops of washing liquid, which represent a large surface area for the exchange of material from the gas to the liquid, are formed at a given critical gas velocity. It has been found that the disappearance of the liquid stream in the gap between the rings occurs at a gas velocity of 1.8 m/s in the case of low pressure apparatus and scrubbing with water. Tests conducted with liquids of a different viscosity or a different degree of viscosity produced resulted in critical velocities of gas. Thus, a critical velocity of approximately 2 m/s is found when a low viscosity washing oil is used.

If the gas velocity is increased further, an increasing spraying of the liquid sheet is produced up to a maximum critical velocity at which the kinetic energy of the drops is so great that it either results in too great a striking of the drops against each other in the lower part of each unit or in a centrifuging of the drops at the wall around the upper part. In the latter case, the drops would no longer be active. This upper critical gas velocity was found to be 4.5 m/s when water was used. With low-viscous washing oil, this upper critical velocity is reached at approximately 5 m/s. A working range of between 1.8 and 6 m/s can be used, depending upon which liquid is used and how high the column's liquid load is. Preferably, the operation takes place between 2 and 3 m/s in order to have the desired low pressure loss.

With this apparatus it is possible to create a gas exchange surface in a relatively small area. The pumping of the liquid to the uppermost unit is the only expenditure of energy that is necessary when the apparatus is used as a scrubber. The new unit can replace the base of a fractionating column, in which the heat effect on the distillate determines the gas or vapor velocity. The cooling action of a cooler determines the quantity of liquid flowing down. These factors must be synchronized with the distance between the rings. This new unit can also be used in a direct heat exchanger between a gas and a liquid, and it also can be used where there is both a heat exchange and an exchange of material.

If the new unit 4 is larger and used in a scrubber with a larger diameter, a smaller unit can be placed inside the other unit. In such a case, the upwardly flowing gas first passes inwardly between the rings of the lower series of the large unit and then between the lower rings of the smaller unit inside of it. Then the gas flows out between the upper rings of the smaller unit and finally out between the upper rings of the outer unit into the area between it and the encircling shell. The space between the outside ring of the large unit and the outside ring of the smaller unit can be more or less shut off from the passage of gas.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In gas and liquid contact apparatus, the combination with a vertical shell having a top and bottom and provided at its lower end with a gas inlet and at its upper end with a gas outlet, of a horizontal outer ring in said shell sealed to the side wall thereof, an upper series of horizontally flat rings arranged in a vertically spaced-apart relation above said outer ring and decreasing in size upwardly, a horizontal top plate smaller than the uppermost ring and spaced above it, a lower series of horizontally flat rings arranged in a vertically spaced-apart relation between said outer ring and decreasing in size downwardly, means supporting said top plate and both series of rings in horizontally spaced planes, and means for continuously delivering a liquid to said top plate, the rings being arranged to cause liquid leaving the edge of the top plate to cascade down said upper series of rings by passing over their outer edges and vertically through the spaces between said horizontally flat rings thereof and then causing the liquid to cascade down said lower series of rings by passing over their inner edges and vertically through the spaces between said horizontally flat rings thereof, said rings in each of said series being arranged with their edges lying in a non-overlapping relationship such that said liquid cascading will be from each ring to the ring directly below it.

2. In gas and liquid contact apparatus according to claim 1, said top plate and rings forming a unit, said apparatus including a plurality of like units disposed in vertically spaced relation, and the size of the inside of the lowermost ring in the upper unit being substantially equal to the size of the outside of the top plate in the unit below it.

3. In gas and liquid contact apparatus according to claim 1, said top plate and all of said rings being substantially concentric with said shell.

4. In gas and liquid contact apparatus according to claim 1, said rings representing annular portions of a disk having a diameter equal to the outer diameter of said outer ring.

5. In gas and liquid contact apparatus according to claim 1, said supporting means being stepped members provided with steps supporting said rings.

6. In gas and liquid contact apparatus according to claim 1, means for supplying a gas to said shell inlet at a velocity great enough to separate the cascading liquid into very fine particles.

7. In gas and liquid contact apparatus according to claim 1, said top plate and rings forming a unit, and said supporting means being inclined strips provided with steps supporting said rings, said apparatus including a plurality of like plate and ring units disposed in vertically spaced relation in the shell.

* * * * *